(12) United States Patent
Kozlovski

(10) Patent No.: US 11,308,455 B2
(45) Date of Patent: Apr. 19, 2022

(54) MANAGEMENT, TRACKING, ANALYSIS OF TASKS AND CALENDAR EVENTS

(71) Applicant: Nikita Kozlovski, Redwood City, NY (US)

(72) Inventor: Nikita Kozlovski, Redwood City, NY (US)

( * ) Notice: Subject to any disclaimer, the term of this patent is extended or adjusted under 35 U.S.C. 154(b) by 146 days.

(21) Appl. No.: 16/699,177

(22) Filed: Nov. 29, 2019

(65) Prior Publication Data

US 2020/0175479 A1 Jun. 4, 2020

Related U.S. Application Data

(60) Provisional application No. 62/772,456, filed on Nov. 28, 2018.

(51) Int. Cl.
*G06Q 10/10* (2012.01)
*G06F 3/04883* (2022.01)
*G06F 3/0482* (2013.01)
*G06F 9/54* (2006.01)

(52) U.S. Cl.
CPC ....... *G06Q 10/1097* (2013.01); *G06F 3/0482* (2013.01); *G06F 3/04883* (2013.01); *G06F 9/542* (2013.01)

(58) Field of Classification Search
CPC ....... G06Q 10/06311; G06Q 10/06316; G06Q 10/1097
See application file for complete search history.

(56) References Cited

U.S. PATENT DOCUMENTS

| | | | | |
|---|---|---|---|---|
| 5,530,861 A * | 6/1996 | Diamant | ............. | G06F 9/45512 705/7.21 |
| 6,047,260 A * | 4/2000 | Levinson | ....... | G06Q 10/063114 705/7.15 |
| 8,434,053 B2 * | 4/2013 | Palmieri | ................... | G06F 8/61 717/101 |
| 8,463,670 B2 * | 6/2013 | Chaar | ................ | G06Q 10/0639 705/32 |
| 9,811,791 B2 * | 11/2017 | Koerner | ........... | G06Q 10/06393 |
| 10,521,752 B1 * | 12/2019 | Williamson | ... | G06Q 10/063114 |
| 2017/0270455 A1 * | 9/2017 | Chi | ................ | G06Q 10/063112 |

* cited by examiner

*Primary Examiner* — Alvin H Tan
(74) *Attorney, Agent, or Firm* — Boag Law, PLLC

(57) ABSTRACT

A system and method enabling a user to manage tasks and events, and enabling a user to seamlessly manage and track their work and life tasks in a single application. In embodiments of the invention a mobile computing device is enabled using specialized software, remote storage, and computing systems to provide the task and event management functionality.

14 Claims, 8 Drawing Sheets

Task work in-progress

On a break (Paused)

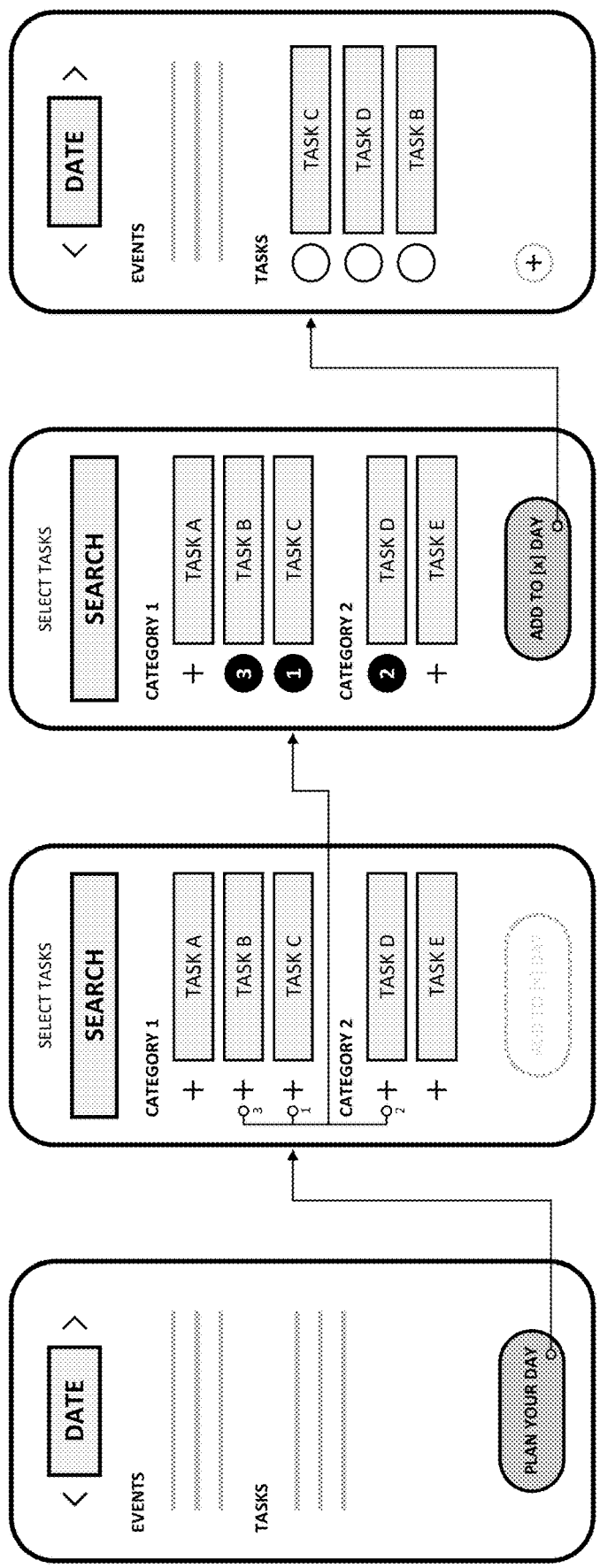

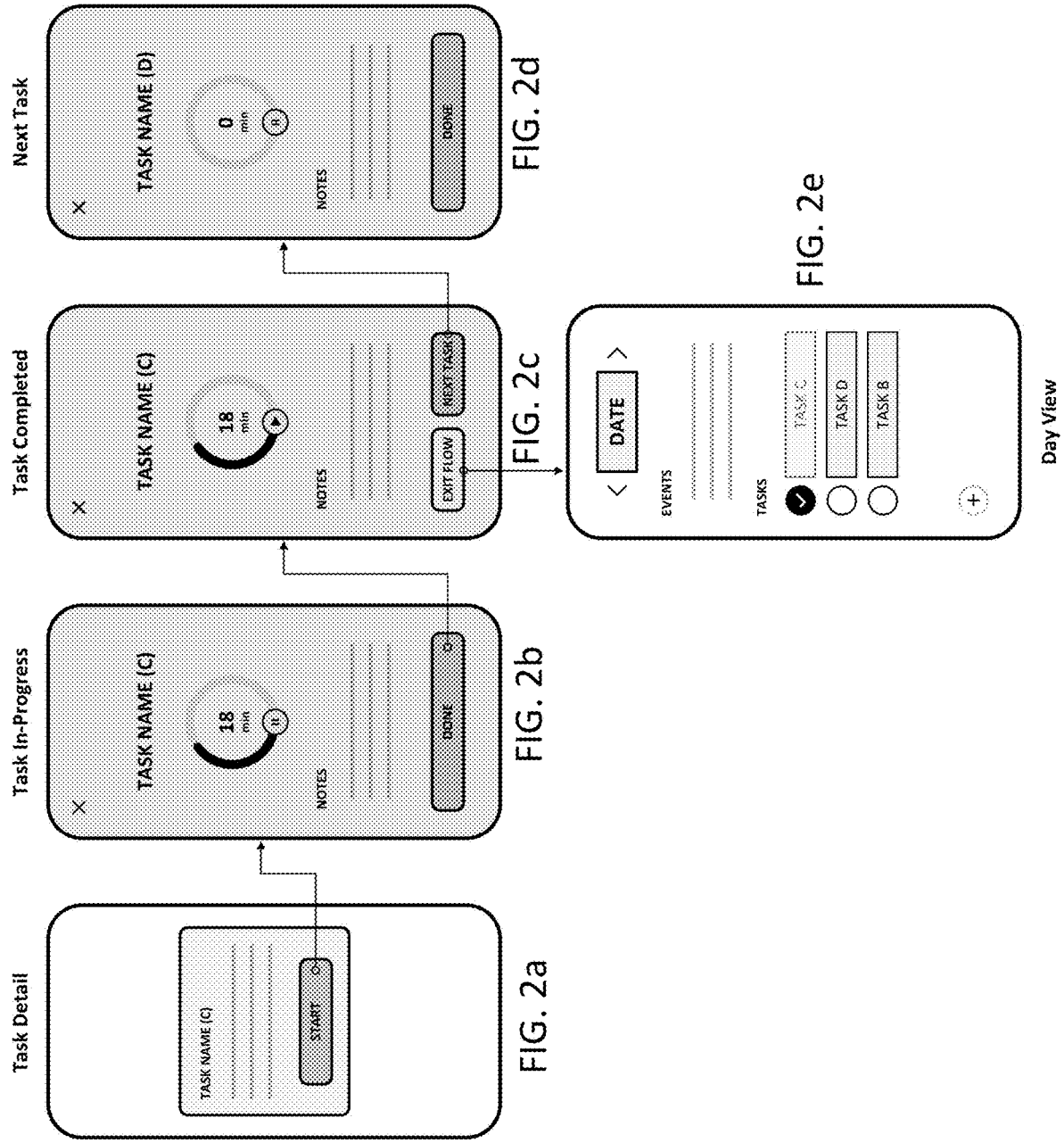

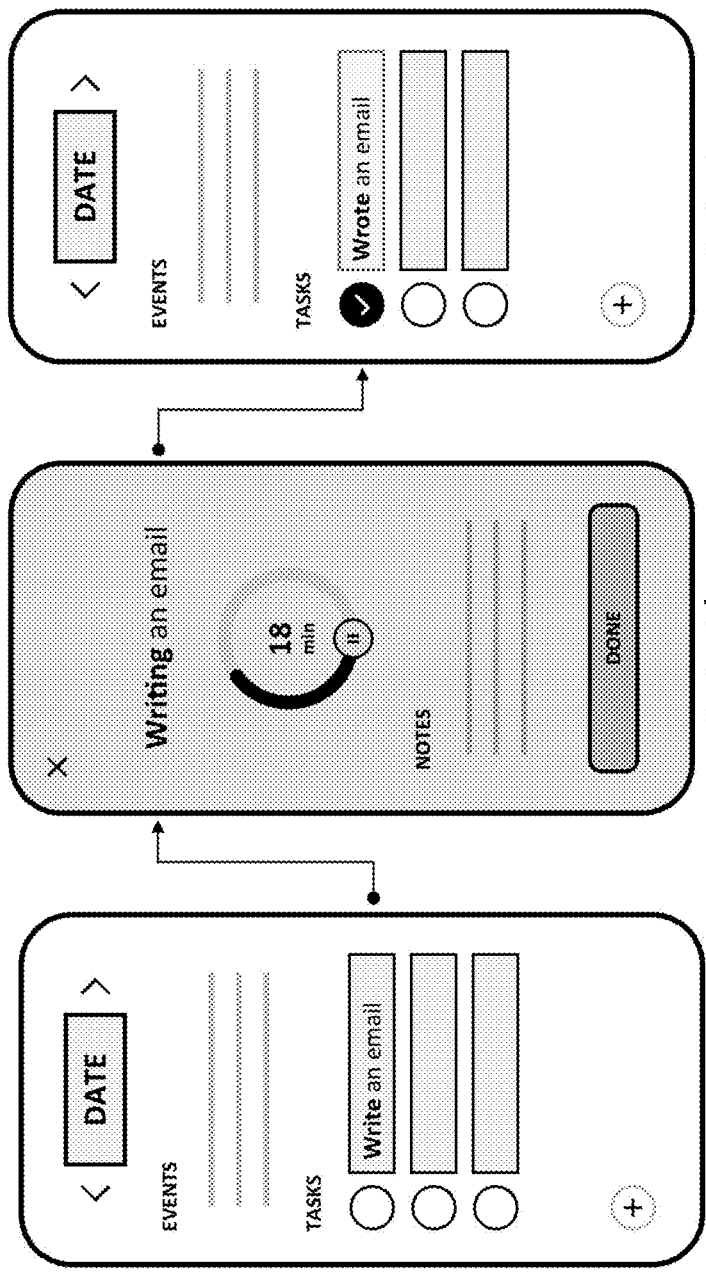

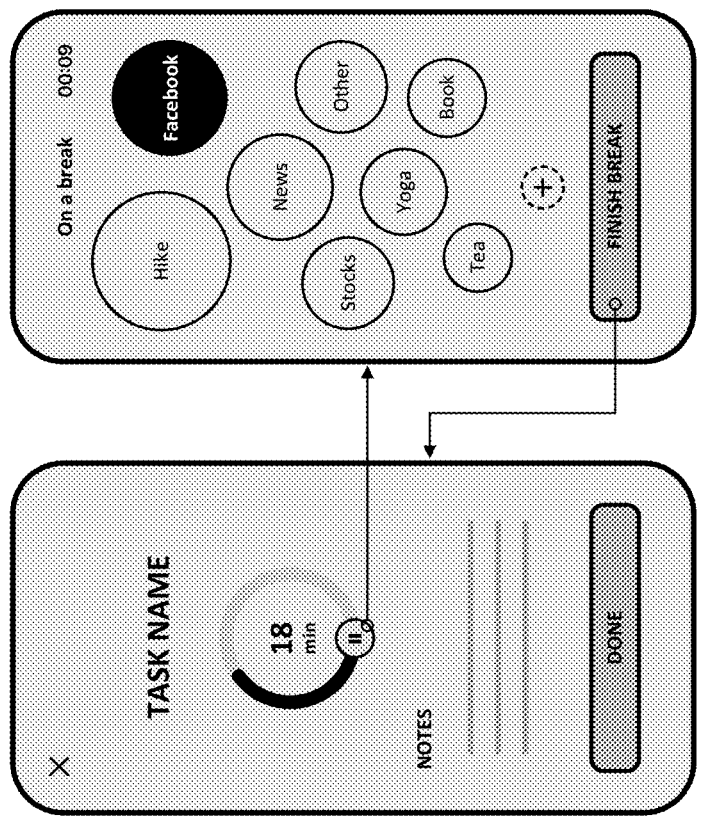

MANAGEMENT, TRACKING, ANALYSIS OF TASKS AND CALENDAR EVENTS

PRIORITY CLAIM

This application claims priority to U.S. Patent Application No. 62/772,456, filed Nov. 28, 2018, and titled, "MANAGEMENT, TRACKING, ANALYSIS OF TASKS AND CALENDAR EVENTS," the contents of which is incorporated by reference in its entirety.

BACKGROUND

People have an inherent desire to be more productive and accomplish more in less time. Studies show that a significant portion of work time is wasted on figuring out what to do next and frequent distractions. Disorganized and never-ending to-do lists, ambiguous task descriptions, inability to focus on one task, missed arbitrary deadlines, and piling up of incomplete tasks are the key contributing factors to a person's elevated stress levels, unfulfilling and demoralizing work experience, and increased likelihood of chronic procrastination. No current mobile productivity software solutions incorporate the latest research data and recommendations that have been proven to make people more productive. "Productivity" is consistently ranked in the top 3 most popular app categories in mobile software. However, a lack of a simple and intuitive personal task management app based on science and research prevents mass adoption, as most users opt to use notes and calendars to manage their workflow.

There is this thus a need for a system and method to help users seamlessly manage and track their work and life tasks and events in one place, using uniquely designed sets of systems, methods, and graphical user interfaces to create a more meaningful and productive work-life experience.

BRIEF DESCRIPTION OF THE DRAWINGS

The features and advantages of the present disclosure will be more fully understood with reference to the following detailed description when taken in conjunction with the accompanying figures, wherein:

FIGS. 1a-1d depict a process for assigning tasks to specific dates and setting the order of priority, according to embodiments of the invention.

FIGS. 2a-2e depict a single-task focus mode with time tracking and seamless transition to the next task, according to embodiments of the invention.

FIGS. 3a-3c depict a process for automatic changing of verb tense to match the stage of task execution, according to embodiments of the invention.

FIGS. 5a-5b depict a system for visually time tracking breaks by type of break, according to embodiments of the invention.

SUMMARY OF THE INVENTION

Figure 4C:
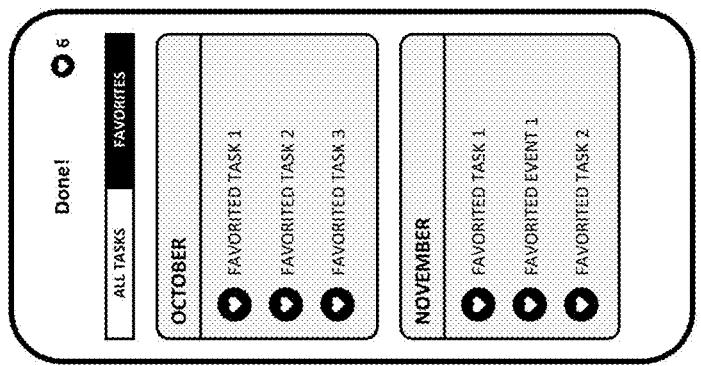
FIGS. 4a-4c depict a process for reviewing and rating tasks upon completion, according to embodiments of the invention.

In embodiments of the invention, a method of executing tasks in a computing device comprises receiving a sequence of tasks from a hardware-based storage database, and displaying, on an application user interface having an interface display including a plurality of interface elements, a sequence of tasks defining a first active state. In embodiments of the invention, the method further comprises receiving an indication from the user to commence execution of a first task in the sequence of tasks and transitioning to a second active state, wherein the interface display displays at least one task datum and graphical task interface elements corresponding a completion status of the task, an option to mark the task complete, and an option to interrupt the execution of the task.

In embodiments, when a task is completed, adding a record to the database, and transitioning to a third active state in the interface display that solicits feedback from the user on a satisfaction metric corresponding to the task. In further embodiments, when an interrupt signal is received from a user in a second active state, transitioning to a fourth active state where the interface display presents a plurality of interface elements corresponding to possible factors why the task was terminated prior to completion, prompting the user to select at least one, and adding a record to the database. In still further embodiments, a user may engage an interface element corresponding to a break, thereby transitioning to a fifth active state in which the interface display shows at least one graphical break indicator corresponding to a type of break taken and aggregate time spent on that break type; receiving a break signal from user via the display; and causing the interface display to present to the user a selection of interface icons corresponding to user characteristics for a time period, receiving input from the user relative to the user characteristics, recording the input in the database, and calculating at least one correlative statistic.

In embodiments of the invention the first active state further enables the user to order the sequence of tasks according to at least one of the due date, importance, and duration. In further embodiments, the computing device is configured to receive gesture-based input to modify a task in the sequence of tasks with a single gesture. In embodiments, the graphical task interface elements comprise a graphical element that changes in appearance with time relative to the completion of the task. In embodiments, the graphical break indicator comprises a visual element having a size that correlates to the amount of time spent by the user on a given break activity. In embodiments, the satisfaction metric may be one of user interest, time spent, and difficulty. In embodiments of the invention, the at least one correlative statistic links user characteristics to task completion or performance.

In embodiments of the invention, a computing device may be provided that is configured to implement the foregoing features.

DETAILED DESCRIPTION

A system and method for aiding a user in selecting, prioritizing, managing, and performing tasks is described. In embodiments, the invention, a custom mobile app or web application may be provided to facilitate the user-facing elements, with a particularized computing system framework provided for implementing the features described in this specification.

FIGS. 1a-1d depict a mobile application device running a task management app according to an embodiment of the invention. Referring to FIG. 1a, a user operating a mobile computing device running the software of the present invention may choose any date using a date browser and select the PLAN YOUR DAY icon to access the SELECT TASKS interface shown in FIG. 1b. The interface shown in FIG. 1b may allow the user to choose from a list of previously-entered tasks or task lists. To assign tasks to the date selected in FIG. 1a, the user may select the "+" icon next to a task. The desired order of completion may be indicated by the order the user assigns the task to the day, or manually. As the user taps the "+" icons, the display may change to filled circles with a number indicating their order, as shown in FIG. 1c. Selecting the ADD TO TODAY icon may close the screen and return to the view of FIG. 1a where the tasks added to the day are presented in the order selected in the previous screen. The user may subsequently hold-to-rearrange the order of tasks in this view, assigning more existing tasks to the day by pressing the (+) plus icon.

FIGS. 2a-e depict a single-task focus mode with time tracking and seamless transition to the next task, according to embodiments of the invention. Referring to FIG. 2a, a single-task focus mode is shown. After selecting a task for completion, the user may select the START icon to initiate a TASK-IN-PROGRESS mode, as shown in FIG. 2b, where the time spent by the user in completing the task is logged for later analysis.

As shown in FIG. 2b, a Task-In-Progress mode may show a task name, present a visual timer for graphically displaying the time spent on the text, and allow the entry of notes related to the task. The TASK-IN-PROGRESS mode may be known as the FOCUS mode in embodiments of the invention. Once the task is completed, the user may select the DONE icon, which transitions the system to the TASK COMPLETE mode shown in FIG. 2c.

After completing a task, the user may be seamlessly transitioned to the next task in the task list without returning to the main list of tasks. Studies show that looking at a list of tasks can be distracting and causing the brain to jump to less important easier tasks. Using this FOCUS mode may enable the user to continue working on one task, add and save notes, and take a break, all without leaving FOCUS mode. FIGS. 2c-2d show this seamless transition from TASK NAME in FIG. 2c to TASK NAME in FIG. 2d. In the event that the user opts to exit the FOCUS mode by selecting the EXIT FLOW icon in FIG. 2c, control moves back to DAY VIEW in FIGS. 2d-2e.

In embodiments of the invention, individual task names and descriptions may be dynamic and responsive to the status of the task. In embodiments of the invention, the system may recognize the first action verb and change its tense automatically based on which state the task is in. Referring to FIG. 3a, the incomplete task titled "write an email" is changed in the FOCUS mode view of FIG. 3b to "writing an email." Upon completion, the task is described as "wrote an email," as shown in FIG. 3c.

Figure 4B:
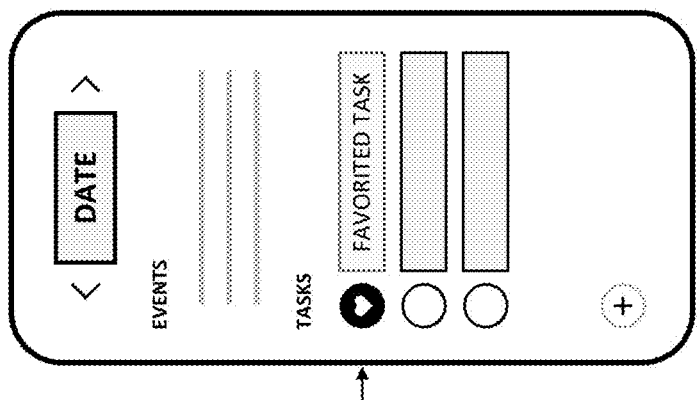
Figure 4A:
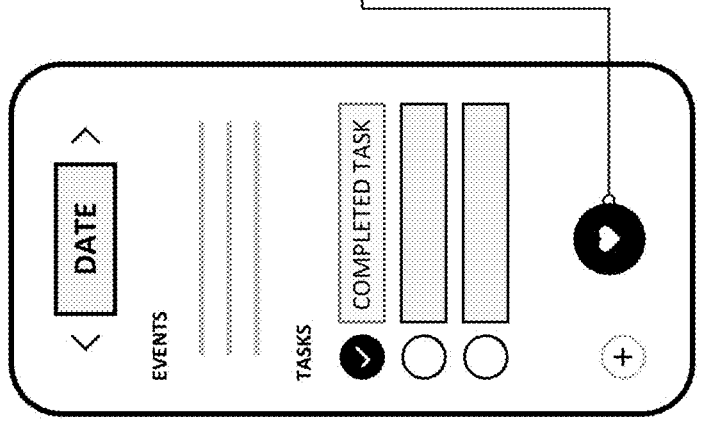

FIGS. 4a-4c depict a process for reviewing and rating tasks upon completion. In embodiments of the invention, an icon—a heart icon is shown in FIG. 4a—may appear, inviting the user to reflect on the completed task, and decide if they want to add it to a FAVORITES list. The user may then be able to review a list of tasks and events that they enjoyed for every month and year. Collecting this data will help the user understand which categories of tasks bring them the most joy and happiness, which in turn can make them more productive, and help make more meaningful work choices in the future. Studies show that revisiting and celebrating your accomplishments can provide a significant confidence and positivity boost to tackle a new set of tasks. Research also shows that noting things that made you feel happy or grateful trains your mind to seek out positive in the world, which can increase your energy and motivation.

FIGS. 5a-5b depict a process for visually tracking the breaks taken by a user during the performance of a series of tasks, the visual tracking being organized by the type of break taken by the user.

As shown in FIG. 5a, a user in the single task focus mode may take a break from performing a given task by selecting the pause icon, which may stop the timer measuring the time spent on the task. Pausing the task may commence a BREAK MODE as shown in FIG. 5b.

In BREAK MODE, the user may select from previously-entered break types or create a new category of break type by selecting the (+) icon. Tapping a particular break icon will commence time tracking for the selected break type. Referring to FIG. 5b, example break types may include break types focused on the mobile computing device or taking place on the mobile computing device—e.g., Facebook, News, Stocks—or may involve offline activities logged on the device—e.g., hiking, yoga, tea, reading.

In BREAK MODE, the time spent on the selected break time may be logged and shown as a timer. The upper-right corner of the screen shown in FIG. 5b shows such a timer. In embodiments, the time spent on a particular break type may be graphically represented on the device. Referring again to FIG. 5b, the graphical circle surrounding the break type may grow in size as more time is tracked for that break type. In embodiments, the circles may be rearranged relative to the time spent on the various tasks. In embodiments, larger circles may move toward the top of the screen, and small circles to the bottom.

By adding a visual element to break times, users may be encouraged to take additional break time and increase overall performance. Research shows that taking breaks and stepping away from work can help reflect, recharge, and return with a different perspective. Taking breaks in a timed and organized manner makes the breaks more enjoyable and rewarding, rather than feeling guilty.

Figure 6C:
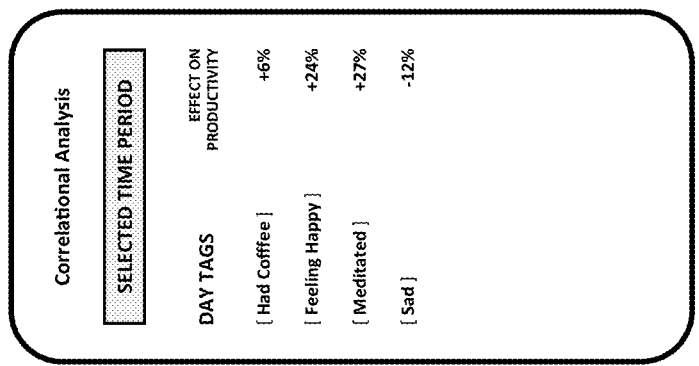
FIGS. 6a-6c depict of a process for assigning tags to days for subsequent correlation analysis, according to embodiments of the invention.
Figure 6B:
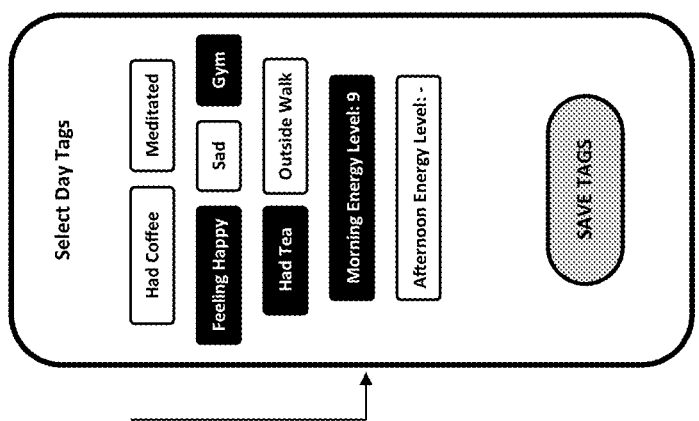
Figure 6A:
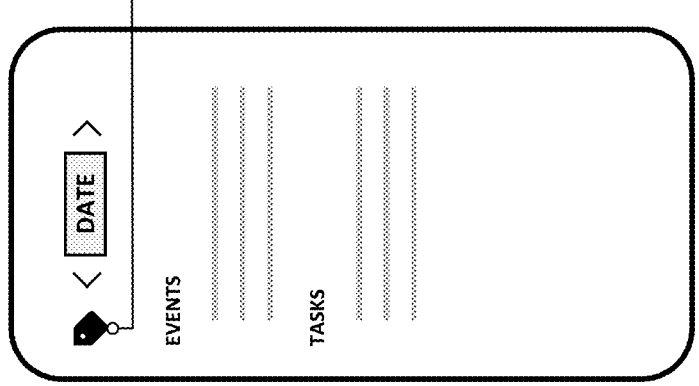

FIGS. 6a-6c depicts a process for assigning tags to days for subsequent correlation analysis, according to embodiments of the invention. Referring to FIG. 6a, a typical DATE schedule is shown, listing events and tasks for the particular day. The user may apply a TAG to the given day by selecting a graphical tag icon, which may move control to a tag selection screen as shown in FIG. 6b. There, the user may assign tags to the day that correlate to certain attributes and characteristics of the day. For example, if the user practiced meditation that day, the meditation tag may be selected. If the user went to the gym that day, a gym tag would be selected. In addition to binary choices, tag attributes may be applied on a sliding scale. For example, the user may rate their quality of sleep the previous night on a scale, e.g., 1 through 10.

After a quantity of data has been accumulated, the user may evaluate how these tags affect their productivity over time using statistical correlational analysis. FIG. 6c shows an exemplary CORRELATIONAL ANALYSIS mode. In this example, on days where the user consumed coffee, there was a 6% increase in productivity. Practicing meditation in this example resulted in a 27% increase in productivity. The correlational analysis will become more accurate and therefore useful the more the user uses this feature and provides statistical data to the system.

Figure 7B:
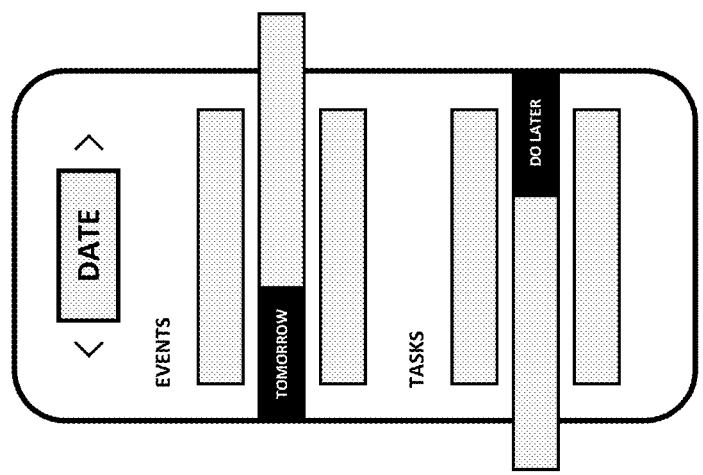
FIGS. 7a-7b depict a one-swipe process for rescheduling tasks and events, according to embodiments of the invention.
Figure 7A:
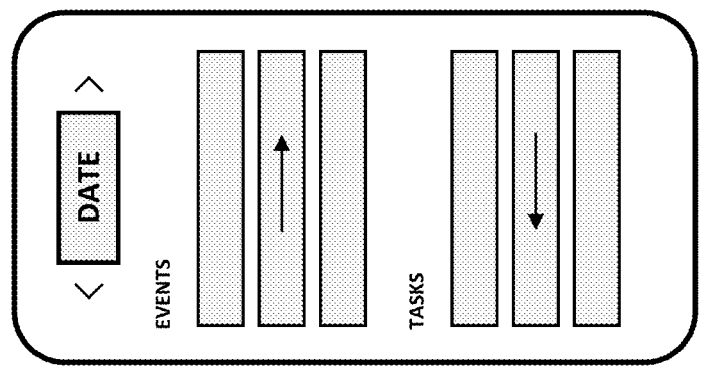

FIGS. 7a-7b depict a finger gesture system for automatically rescheduling tasks and events. Predefined actions may be assigned to particular gestures that act on tasks and events. FIG. 7b shows one example where a swipe-right gesture on the device on any task moves it to the following day. A swipe-left gesture on the display postpones the task indefinitely.

Figures 8A, 8B:
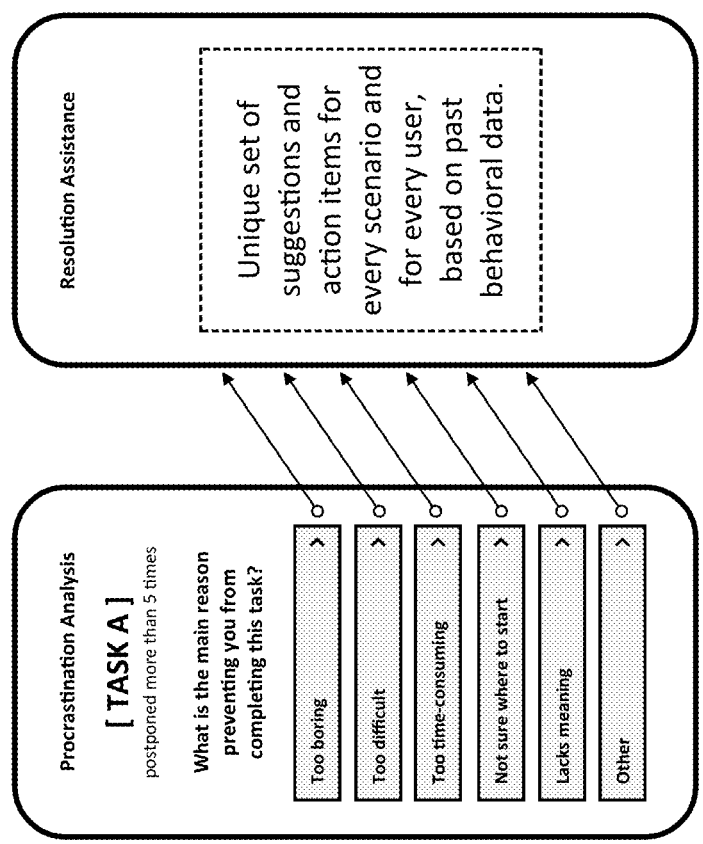
FIGS. 8a-8b depict a process for AI-guided productivity assistance and analysis, according to embodiments of the invention.

FIGS. 8a-8b depict a process for AI-guided productivity assistance and analysis, according to embodiments of the invention. In embodiments, algorithms and machine-learning techniques may be used to learn user behavior and provide productivity suggestions based on preset recommended practices. In embodiments, artificial intelligence guided suggestions would improve in accuracy and utility over time as the system gathers more behavioral data.

Referring to FIG. 8a, a sample PROCRASTINATION ANALYSIS mode is shown. In this example, after postponing the task a number of times, the system prompts the user for the main reason that the task has not been completed, offering options such as "too boring," "too difficult," "too time-consuming," and the like. The system analyzes the response data in conjunction with data related to the task or event itself to provide statistical analysis on when the user procrastinates, under what circumstances, for what tasks, and the like. These data may then be used to increase user performance.

In embodiments of the invention, the operations described in this specification may be implemented in digital electronic circuitry, or in computer software, firmware, or hardware, such as a mobile computing device with a touchscreen display such as a smartphone or tablet computing device. In embodiments, the operations described in this specification may be implemented on a personal computing device as dedicated software, or offered remotely as software-as-a-service ("SaaS")

Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, any computer-readable storage device, which may include a computer-readable storage substrate, a random or serial access memory array or device, or a combination of one or more of them. The computer storage medium can also be, or be included in, one or more separate physical components or media (e.g., multiple CDs, disks, or other storage devices).

A computer program can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network. It will be appreciated by those of skill in the art that a "computer program" may also be referred to as a program, software, software application, script, or code, among others.

The processes and logic flows described in this specification may be performed by one or more programmable processors in these computing devices that execute one or more computer programs to perform actions by operating on input data and generating output. The processes and logic flows can also be performed by, and apparatus can also be implemented as, special purpose logic circuitry. Processors suitable for the execution of a computer program may include both general and special purpose microprocessors, and any one or more processors of any kind of digital computer.

In embodiments, a computing device utilized with the inventions disclosed in this specification may include, or be operatively coupled to receive data from or transfer data to, or both, one or more mass storage devices for storing data, such as flash memory, magnetic storage, or optical storage. Moreover, a computing device may be embedded in another device, e.g., a smartphone, mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Computing devices used in conjunction with embodiments of the inventions disclosed in this specification may provide, for interaction with a user, a display device, for displaying information to the user and preferably receiving touchscreen input. Optionally, a display device may include a CRT (cathode ray tube) or LCD (liquid crystal display) monitor. Optionally, input from a user may be received via a keyboard and a pointing device, e.g., a mouse or a trackball, by which the user can provide input to the computing device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Embodiments of the subject matter described in this specification can be implemented using a system including clients and servers. A client and server are generally remote from each other and typically interact through a communication network. The relationship of client and server arises by virtue of computer programs running on the respective computing devices and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

I claim:

1. A method of executing tasks in a computing device, comprising: receiving a sequence of tasks from a hardware-based storage database;
    displaying, on an application user interface having an interface display including a plurality of interface elements, a sequence of tasks defining a first active state;
    receiving an indication from the user to commence execution of a first task in the sequence of tasks and transitioning to a second active state, wherein the interface display displays at least one task datum and graphical task interface elements corresponding a completion status of the task, an option to mark the task complete, and an option to interrupt the execution of the task;
    wherein, when a task is completed, adding a record to the database, and transitioning to a third active state in the interface display that solicits feedback from the user on a satisfaction metric corresponding to the task;
    wherein, when an interrupt signal is received from a user in a second active state, transitioning to a fourth active state where the interface display presents a plurality of interface elements corresponding to possible factors why the task was terminated prior to completion, prompting the user to select at least one, and adding a record to the database;
    wherein, when a user engages an interface element corresponding to a break, transitioning to a fifth active state in which the interface display shows at least one graphical break indicator corresponding to a type of break taken and aggregate time spent on that break type; receiving a break signal from user via the display; and
    causing the interface display to present to the user a selection of interface icons corresponding to user characteristics for a time period, receiving input from the user relative to the user characteristics, recording the input in the database, and calculating at least one correlative statistic.

2. The method of executing tasks in a computing device according to claim 1, wherein the first active state further enables the user to order the sequence of tasks according to at least one of: due date, importance, and duration.

3. The method of executing tasks in a computing device according to claim 1, wherein the computing device is configured to receive gesture-based input to modify a task in the sequence of tasks with a single gesture.

4. The method of executing tasks in a computing device according to claim 1, wherein the graphical task interface elements comprises a graphical element that changes in appearance with time relative to the completion of the task.

5. The method of executing tasks in a computing device according to claim 1, wherein the graphical break indicator comprises a visual element having a size that correlates to the amount of time spent by the user on a given break activity.

6. The method of executing tasks in a computing device according to claim 1, wherein the satisfaction metric is one of user interest, time spent, and difficulty.

7. The method of executing tasks in a computing device according to claim 1, wherein the at least one correlative statistic links user characteristics to task completion or performance.

8. A computing device, comprising:
    a processor configured with processor-executable instructions to perform operations comprising:
    receiving a sequence of tasks from a hardware-based storage database;
    displaying, on an application user interface having an interface display including a plurality of interface elements, a sequence of tasks defining a first active state;
    receiving an indication from the user to commence execution of a first task in the sequence of tasks and transitioning to a second active state, wherein the interface display displays at least one task datum and graphical task interface elements corresponding a completion status of the task, an option to mark the task complete, and an option to interrupt the execution of the task;
    wherein, when a task is completed, adding a record to the database, and transitioning to a third active state in the interface display that solicits feedback from the user on a satisfaction metric corresponding to the task;
    wherein, when an interrupt signal is received from a user in a second active state, transitioning to a fourth active state where the interface display presents a plurality of interface elements corresponding to possible factors why the task was terminated prior to completion, prompting the user to select at least one, and adding a record to the database;
    wherein, when a user engages an interface element corresponding to a break, transitioning to a fifth active state in which the interface display shows at least one graphical break indicator corresponding to a type of break taken and aggregate time spent on that break type; receiving a break signal from user via the display; and causing the interface display to present to the user a selection of interface icons corresponding to user characteristics for a time period, receiving input from the user relative to the user characteristics, recording the input in the database, and calculating at least one correlative statistic.

9. The computing device according to claim 8, wherein the first active state further enables the user to order the sequence of tasks according to at least one of :
due date, importance, and duration.

10. The computing device according to claim 8, wherein the computing device is configured to receive gesture-based input to modify a task in the sequence of tasks with a single gesture.

11. The computing device according to claim 8, wherein the graphical task interface elements comprises a graphical element that changes in appearance with time relative to the completion of the task.

12. The computing device according to claim 8, wherein the graphical break indicator comprises a visual element having a size that correlates to the amount of time spent by the user on a given break activity.

13. The computing device according to claim 8, wherein the satisfaction metric is one of user interest, time spent, and difficulty.

14. The computing device according to claim 8, wherein the at least one correlative statistic links user characteristics to task completion or performance.

* * * * *